United States Patent
Paul et al.

(10) Patent No.: US 9,141,962 B2
(45) Date of Patent: Sep. 22, 2015

(54) METHOD AND SYSTEM FOR DETERMINING A BEST PRICE FOR MULTIMEDIA CONTENT

(75) Inventors: Sanjoy Paul, Bangalore (IN); Santosh Krishnamurthy, Bangalore (IN)

(73) Assignee: Infosys Limited (IN)

( * ) Notice: Subject to any disclaimer, the term of this patent is extended or adjusted under 35 U.S.C. 154(b) by 206 days.

(21) Appl. No.: 12/813,677

(22) Filed: Jun. 11, 2010

(65) Prior Publication Data

US 2011/0161995 A1    Jun. 30, 2011

(30) Foreign Application Priority Data

Dec. 24, 2009   (IN) .......................... 3176/CHE/2009

(51) Int. Cl.
*G06Q 30/02* (2012.01)

(52) U.S. Cl.
CPC ...................................... *G06Q 30/02* (2013.01)

(58) Field of Classification Search
CPC ....................................................... G06Q 30/02
USPC ................................. 705/14.23, 14.51; 725/5
See application file for complete search history.

(56) References Cited

U.S. PATENT DOCUMENTS

| | | | |
|---|---|---|---|
| 2002/0194065 A1* | 12/2002 | Barel et al. ...................... | 705/14 |
| 2003/0212608 A1* | 11/2003 | Cliff ................................ | 705/26 |
| 2008/0275757 A1* | 11/2008 | Sharma et al. .................. | 705/10 |
| 2009/0006191 A1* | 1/2009 | Arankalle et al. .............. | 705/14 |

* cited by examiner

*Primary Examiner* — Eric Netzloff
(74) *Attorney, Agent, or Firm* — Lerner, David, Littenberg, Krumholz & Mentlik, LLP

(57) ABSTRACT

A method and system for determining a best price to rent a multimedia content being offered for viewing by at least one service provider to a plurality of users through a communication network is provided. The service provider offers the multimedia content to the plurality of users at a base price. The method includes receiving a first price from the user that he/she is willing to pay for the multimedia content. The first price is lesser than the base price. The method further includes calculating a number of commercials that need to be shown the user to recover a cost to show the multimedia content at the first price. Furthermore, the method includes calculating a best price that the service provider can offer to the user when the service provider does not have enough commercials to offer the multimedia content at the first price.

35 Claims, 12 Drawing Sheets

US 9,141,962 B2

METHOD AND SYSTEM FOR DETERMINING A BEST PRICE FOR MULTIMEDIA CONTENT

BACKGROUND OF THE INVENTION

The present invention relates, generally, to the field of multimedia content provision systems, and in particular, to a method and system for determining a best price for multimedia content being offered to users.

Digital Media today is more popular than it has ever been. Digital media can be categorized as Syndicated Content and User Generated Content (UGC). Syndicated content is mostly professionally generated with an expensive video camera and edited with sophisticated tools, therefore sold at a price, whereas the User Generated content is created by an amateur (anyone) with a basic camera and is distributed free of cost. Examples of Syndicated content are Movies and Music video and examples of UGC are pictures of a baby taken by parent. Syndicated content can be made available to viewers in two forms—by broadcasting the content to many users at the same time, for example, broadcasting a sitcom on a TV channel or by offering the content to the users in an interactive fashion, for example, offering specific movies to a customer by interactively seeking her preferences. The prime difference between these modes of distribution is presence or absence of commercials. Broadcast TV offers syndicated content to users at a price that is derived based on a number of commercials that are available. On the other hand, interactive TV offers content to users on a premium, with little or no commercials.

Interactive distribution of content which allows users to choose what they want, when they want has enabled many new business models for content monetization. Content offers such as Pay per View (PPV), rent-a-movie, bundles and subscription are among the many that are used to sell content on Interactive TV. Video storefronts on the Internet allow buying or renting of movies, music videos and TV programs at a price to anyone on the Interactive TV and the Internet.

Video on Demand (VoD) systems are used to distribute syndicated content to users interactively. VoD systems allow users to choose content using the Internet or an application on a set-top box. The content is distributed by streaming it through the set-top box, or downloading content onto a device such as a computer, digital video recorder, personal video recorder or portable media player for viewing at a later time.

The traditional broadcast TV model of distribution has a number of drawbacks. The program on Broadcast TV is played as per a predefined schedule called Program Guide therefore users have to stick to the schedule if they want to watch a program and have no control over it. Since the pricing model for broadcast TV includes inclusion of commercials, commercials, which may discourage users from continuing to watch the content, need to be shown throughout the broadcast. Moreover, the users also do not get an option to reduce the commercial break duration.

From a service provider's perspective, broadcast TV does not allow flexibilities in the commercials schedule for a particular content as broadcasting is scheduled before hand. Further, advertisers get less time to impress users with their products as top rated shows on TV have many advertisers. Broadcast TV is primarily broadcast in nature therefore the syndicated content is broadcasted to all users at the same time. This makes it difficult to target users with relevant commercials in the broadcast. Targeted advertising for a particular geographical location is possible, but broadcast TV doesn't allow granularity to the last detail of a particular user.

Further, there exist users who are willing to pay a small premium for reduced commercials duration for certain content. No provision exists in the current broadcast TV model to monetize such opportunities.

On the other hand, Interactive TV services like VoD allow users to choose any video from a catalog and view it at his/her convenience. The users have to buy the VoD content before viewing it. Further, content on VoD Catalog have little or no commercials during telecast which means that the price of the content is high and all users have to pay the same price to view the video. All content in VoD catalog has a fixed set of offers associated with it. The offer price cannot be varied for individual users to sell content. The offer price of VoD content defines the volume of people buying the offer. E.g. During a movie premier, the content is priced high therefore attracting only few users to watch the movie. As the price is reduced over time the movie becomes affordable to the masses. Since Interactive TV is not commercials driven the number of ads in TV are very few. Hence, interactive TV's ability to show context sensitive and targeted ads to its consumers is not exploited to its potential.

Hence, there is a need for a system and a method that allows users to negotiate price of the syndicated content that is offered for viewing. Further, the system and method also needs to provide the user with an option of watching the content at a premium rate to forego any commercials that are shown. Furthermore, the system and the method should allow the service provider to target users based on their profile and preferences.

BRIEF SUMMARY OF THE INVENTION

In one embodiment of the present invention, a method for determining a best price to rent multimedia content to a plurality of users by service providers is provided. The service provider offers multimedia content for viewing at a base price. The method in the present invention includes the step of receiving from a user a first price on a user interface that the user is willing to pay for the multimedia content. The first price chosen by the user is lesser than or equal to the base price. Further, the method includes calculating a number of commercials that need to be shown to the user to enable offering the multimedia content at the first price. This calculation is based on a total number of commercials available with the service provider. Furthermore, the method includes determining, based on the calculations, the best price that the service provider can offer to the user and a second number of commercials that need to be shown to the user for the best price.

In another embodiment of the present invention, another method for determining a best price to rent multimedia content to a plurality of users by service providers is provided. The service provider offers content for viewing, at a base price. The method in the present invention includes the step of receiving from a user a first price on a user interface that the user is willing to pay for the multimedia content. The first price is lesser than or equal to the base price. Further, the method includes the step of calculating a cost that can be recovered to offer the multimedia content to the user at the first price by showing a first set of commercials. This calculation is dependent on a type of interaction of available commercials with the user and a probability of the user interacting with the first set of commercials. Furthermore, the method includes a step for determining the best price and a second number of commercials that the service provider can offer to the user based on the calculations.

In yet another embodiment of the present invention, a system for determining a best price to rent a multimedia content being offered for viewing by at least one service provider to a plurality of users through a communication network is provided. The multimedia content is offered by service provider to the plurality of users at a base price. The system includes a user interface to receive a first price from a user that he/she is willing to pay for the multimedia content. The user sends the first price with the help of a plurality of input mechanisms. Further, the system includes a processor configured to calculate a number of commercials that need to be shown to the user to offer the multimedia content at the first price. The calculation is based on a total number of available commercials with the service provider. The processor is also configured to determine the best price that the service provider can offer to the user. Furthermore, the system includes a commercial insertion module to insert commercials that need to be shown to the user while viewing the multimedia content.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

The present invention relates to a method and system for determining a best price for multimedia content that is offered on rent by a service provider through a communication network, to a plurality of users. An example of this environment includes, but is not limited to, AIRTEL™ DIGITAL TV, a service provider, offering its customers to view entertainment channels through its network. It also offers special content, acquired from content providers, which can be viewed by paying for each view/a day. The service provider offers the multimedia content at a base price. For example, AIRTEL™ DIGITAL TV may offer "The Shawshank Redemption" for $10 and "The Aviator" at $8. The method allows a user from the plurality of users to choose a first price at which she wishes to see the multimedia content. The method then determines a number of commercials that need to be shown to the user to recover a cost of showing the multimedia content at the first price. The number of commercials is calculated based on a total number of available commercials with the service provider, type of interaction of the available commercials with the user, probability of the user interacting with the commercials. Based on these calculations, the service provider decides whether to offer the multimedia content to the user at the first price or at a best price.

Figure 1:
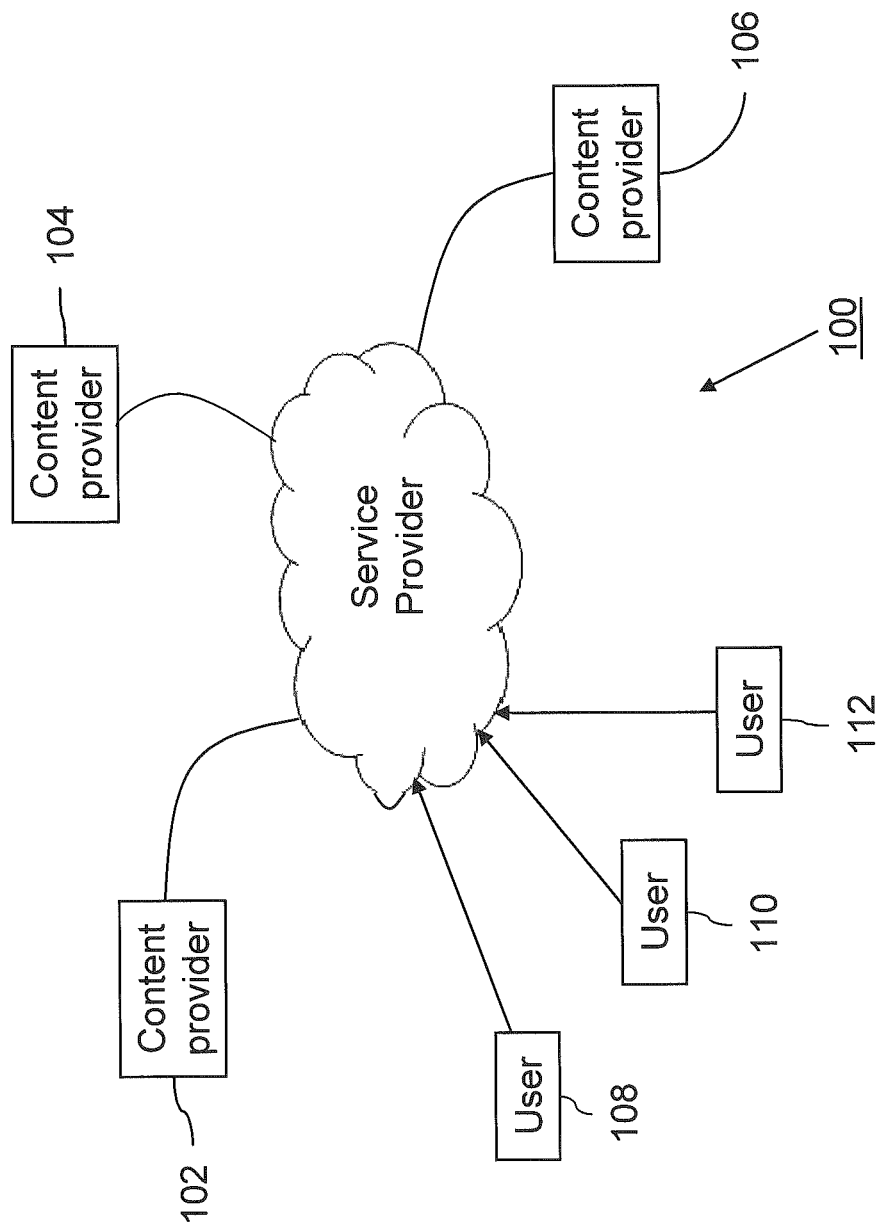
FIG. 1 illustrates a communication network with a plurality of content providers that are integrated by a service provider to provide multimedia content to plurality of users, in which the present invention can be practiced.
Figure 2:
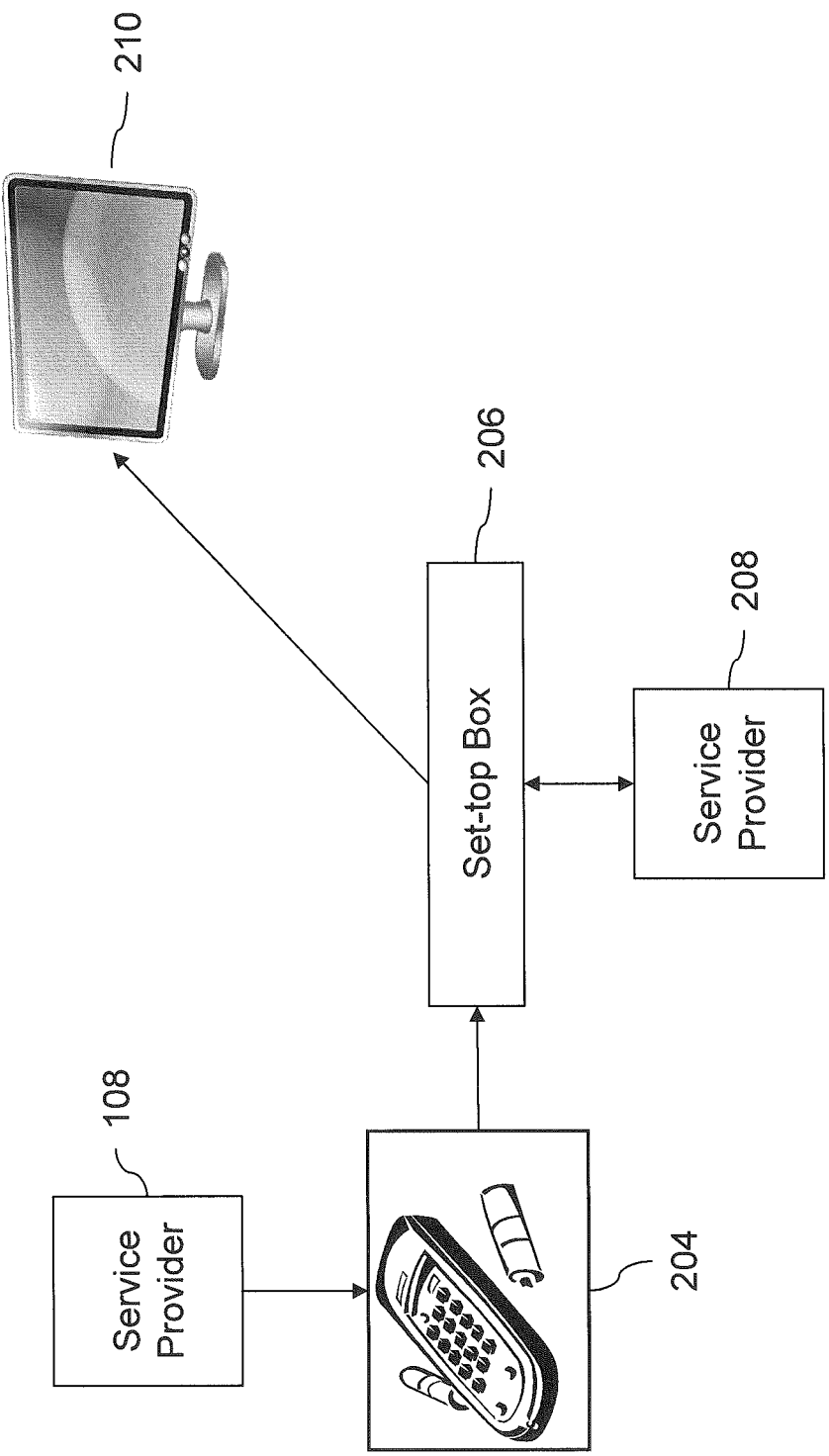
FIG. 2 illustrates a way in which a user from the plurality of users orders the multimedia content from the service provider, in which the present invention can be practiced.

Referring now to the figures, FIG. 1 illustrates a communication network 100 with a plurality of content providers that are integrated by a service provider to provide multimedia content to plurality of users, in which the present invention can be practiced. The communication network 100 comprises a plurality of content providers 102, 104, and 106 that provide content to the service provider to distribute it to the plurality of users 108, 110 and 112. Examples of the plurality of content providers include movie producers, TV series producers, live event managers and owners. The plurality of users are connected to the service provider using a variety of technologies that include, but are not limited to, traditional cable systems, Internet TV, or through a set-top box that is placed at the user's location. The plurality of content providers offers this content to the plurality of users 108, 110 and 112 at a base price. The base price may be governed by the popularity of the multimedia content. User 108 from the plurality of users decides to watch multimedia content from the service provider. The service provider displays options of the content to the users through a storefront that can be accessed using many systems. These systems include television, internet, mobile applications, paper pamphlets, newsletters, or advertisements. FIG. 2 illustrates a way in which users order the multimedia content from the service provider.

FIG. 2 includes user 108 from the plurality of users communicating with the service provider through a variety of input mechanisms that include, but are not limited to, a computer, a remote control, mobile phone, or a touch screen. In one embodiment of the present invention, the user 108 launches an application on the television screen 210 that lists out the multimedia content that is offered for viewing by the service provider. The user 108 then browses this list through a remote control 204 and selects the content that she wishes to watch. The remote control communicates with the service provider 208 through a set-top box 206 that is located at the user's location. The application on the television screen 210 shows, among other details, timing of the screening of the content, cost of viewing the content, cast and other related details. The set-top box 206 communicates the user 108's choice of content to the service provider 208. The service provider then makes provision of letting the user 108 to view the content, either by transmitting it on the communication network or by temporarily storing the content on the set-top box or the television of the user 108. The content that the user 108 is offered at a fixed price (base price) which cannot be negotiated by the user. The present invention addresses this and other limitations of the existing systems described in conjunction with FIG. 2. FIGS. 3-12 describe the method and system of the present invention in greater detail.

Figure 3:
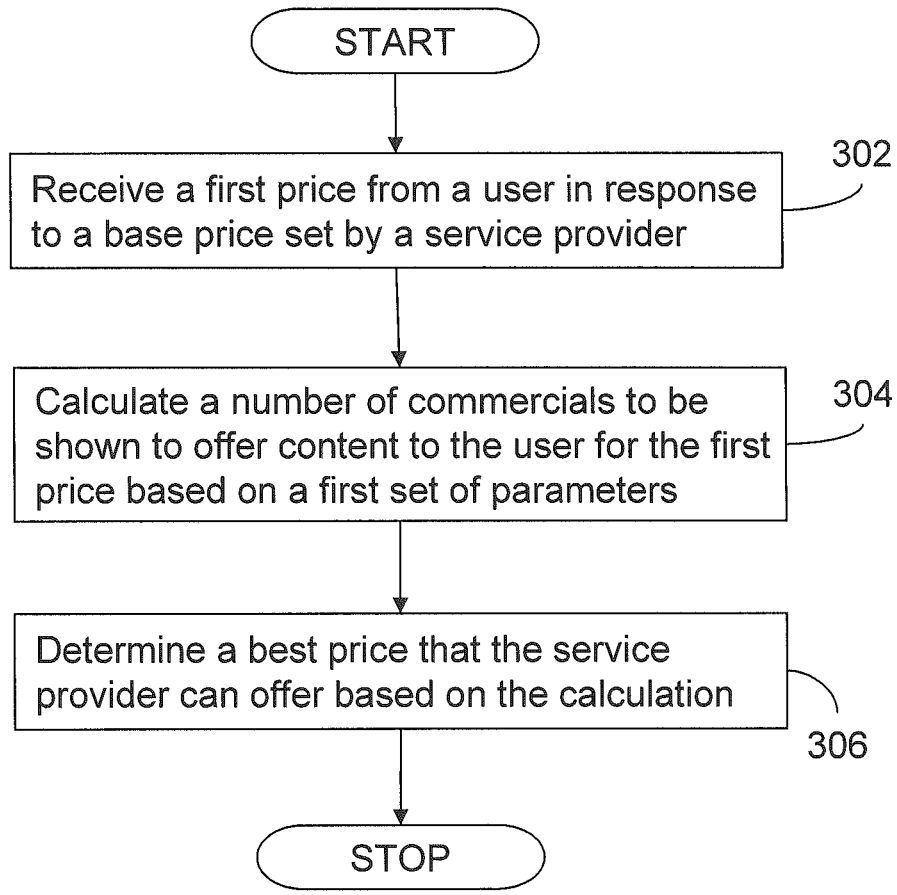
FIG. 3 illustrates a method for determining best price to rent the multimedia content being offered for viewing by the service provider to the user, in accordance with an embodiment of the present invention.

FIG. 3 illustrates a method for determining best price to rent multimedia content being offered for viewing by the service provider to the user, in accordance with an embodiment of the present invention. As explained earlier, the service provider offers the multimedia content to the user at a base price. At step 302 of the method according to one embodiment of the present invention, a first price is received from the user. The first price is a price that the user is willing to pay to view the multimedia content. The first price is less than or equal to the base price. Further, at step 304 a number of commercials that need to be shown to the user to recover a cost of showing the multimedia content to the user at the first price, is calculated. The calculation is based on a total number of available commercials with the service provider. Furthermore, at step 306 the best price at which the service provider can offer multimedia content to the user is determined, when the service provider does not have enough commercials to offer the multimedia content to the user at the first price. The step 306 also includes calculating a second number of commercials that need to be shown to the user 108 to show the multimedia content at the best price.

According to one embodiment of the present invention, the user 108 inputs the first price using a plurality of input mechanisms. The plurality of input mechanisms includes, but is not limited to, a remote control, keyboard, cellular phone, e-mail, text message, or a touch pad. Once the first price inputted by the user is received, a total number of available commercial spots available in the multimedia content is calculated. Commercial spots are specific timings during the multimedia content when commercials can be shown to the user 108. Commercial spots can be determined using varied known methodologies by the service provider. The service provider can fix a stipulated period after which commercials will be played during the telecast, or the service provider can analyze the content and determine times during the telecast when commercials can be inserted.

Further, according to one embodiment, the available commercial spots during the telecast of the content are segregated in groups based on their time of occurrence during the telecast of the multimedia content. The groups of commercial spots include pre-roll, mid-roll, post-roll and banner commercial spots. Pre-roll commercial spots occur before the start of the multimedia content, mid-roll commercial spots occur between the telecast of the multimedia content, post-roll commercial spots occur at the end of the multimedia content, whereas banner commercial spots are played along with the content, and appear as tickers on the screen along with the multimedia content.

Further, the method includes step of receiving an amount that an advertiser wishes to pay for his product commercials in each of the groups of available commercial spots. According to one embodiment, the service provider can either sell each commercial spot in an open auction, or publish advertisements to offer commercial spots for sale. The service provider can also invite for tenders to sell the commercial spots to advertisers. The advertiser also informs to the service provider, a budget fixed for a particular commercial and a deadline before which the commercial needs to be exhausted. Further, a first set of commercials is selected from the total available commercials to populate the number of commercial spots. To select the first set of commercials, eligible commercials are identified from the total available commercials based on the user's profile, relevance to the multimedia content, budget of the commercial, and the deadline of the commercial. A rank for each of the eligible commercials is calculated based on a degree of relevance of the eligible commercial with the user and the multimedia content. Further, the rank is also influenced by the cost that that the eligible commercial can recover in case it is included in the first set of commercials to be shown to the user. The cost is calculated based on the first set of commercials and the amount advertisers of each of the first set of commercials are willing to pay.

Further, eligible commercials, which help recover the cost that needs to be recovered to offer the multimedia content to the user at the first price, are selected in the first set of commercials.

According to another embodiment of the present invention, cost that can be recovered by populating commercials from the first set of commercials in the pre-roll group of commercial spots is calculated. Further, costs that can be recovered by populating the mid-roll, post-roll and banner commercial spots is calculated and a final unrecovered price is calculated by subtracting the cost recovered from the base price. The final unrecovered price is the best price of the multimedia content.

According to one embodiment of the present invention, the method provides for steps to calculate a minimum price for each of the total number of commercial spots available during the multimedia content. A price (P1) for the post-roll commercial spots is fixed. Prices for pre-roll (P2), mid-roll (P3), and banner (P4) commercial spots are expressed in terms of P1 as follows.

$$P2 = l \times P1$$

$$P3 = m \times P1$$

$$P4 = n \times P1$$

Each of the commercial spots is of a fixed length and hence a number of commercial spots in each group for the multimedia content is fixed.
i. Number of Banner Commercial Spots=a
ii. Number of Pre-Roll Commercial Spots=b
iii. Number of Mid-Roll Commercial Spots=c
iv. Number of Post-Roll Commercial Spots=d Based on the above assumptions, a price (P) for all the commercial spots available during the multimedia content can be calculated using the following formula:

$$P = a \times P4 + b \times P2 + c \times P3 + d \times P1$$

$$\therefore P = a \times n \times P1 + b \times l \times P1 + c \times m \times P1 + d \times P1$$

To offer the multimedia content for free the multimedia content base price ($P_B$) needs to be recovered from the price of all the commercial spots in the multimedia content. This can be expressed in the following formula:

$$P_B = P$$

$$\therefore P_B = (a \times n + b \times l + c \times m + d)P1$$

-continued $$\therefore P1 = \frac{P_B}{(an + bl + cm + d)}$$

Commercials in the first set of commercials are selected based on the cost that can recover to allow the service provider to offer the multimedia content to the user 108 at the first price. In case the cost recovered by the first set of commercials doesn't let the service provider offer the multimedia content at the first price, best price is obtained by subtracting cost recovered from the first set of commercials from the base price. The method also includes calculating the second number of commercials that need to be shown to the user 108 to show the multimedia content at the best price.

Figure 4:
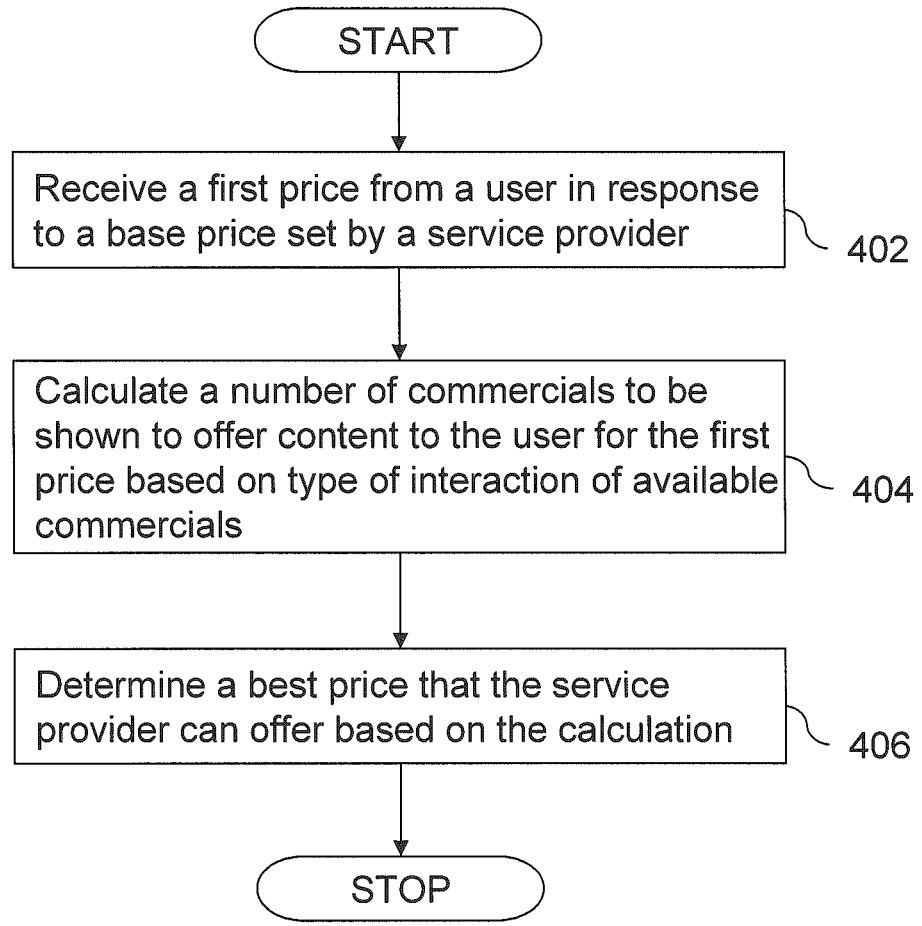
FIG. 4 illustrates another method for determining best price to rent the multimedia content being offered for viewing by the service provider to the user, in accordance with another embodiment of the present invention.

FIG. 4 illustrates another method for determining best price to rent the multimedia content being offered for viewing by the service provider to the user, in accordance with another embodiment of the present invention. The service provider offers the multimedia content to the user at a base price. At step 402 of the method, a first price that the user is willing to pay for the multimedia content is received. At step 404, a number of commercials that needs to be shown to the user 108 to recover a cost to show the multimedia content at the first price, is calculated. The calculation is based on a type of interaction of available commercials with the user 108, and a probability that the user 108 will interact with the commercials. Furthermore, at step 406 the best price at which the service provider can offer multimedia content to the user 108 is determined, when the service provider cannot offer the multimedia content to the user at the first price. The step 406 also includes calculating a second number of commercials that need to be shown to the user 108 to show the multimedia content at the best price.

According to one embodiment of the present invention, the user 108 inputs the first price using a plurality of input mechanisms. The plurality of input mechanisms includes, but is not limited to, a remote control, keyboard, cellular phone, e-mail, text message, or a touch pad. Once the first price inputted by the user is received, a total number of available commercial spots available in the multimedia content are calculated. Commercial spots are specific timings during the multimedia content when commercials can be shown to the user 108. Commercial spots can be determined using varied known methodologies by the service provider. The service provider can fix a stipulated period after which commercials will be played during the telecast, or the service provider can analyze the content and determine times during the telecast when commercials can be inserted.

Further, according to another embodiment of the present invention, available commercials are divided in groups based on their type of interaction with the plurality of users. The groups of commercials include cost-per-thousand-impressions (CPM) commercials, cost-per-click (CPC) commercials, and cost-per-action (CPA) commercials. Cost-per-thousand impressions commercials are commercials that have no actionable object in them and are expected to effect an action from the user after he has viewed and analyzed the product. Cost-per-click commercials are commercials that have an object which allows the user to click and express interest in the product. Further, cost-per-action commercials are commercials which allow the user to buy a product instantaneously.

Further, the method includes step of receiving an amount that an advertiser wishes to pay for his product commercials in each of the groups of available commercials based on a group of available commercial spots. The group of available commercial spots includes pre-roll, mid-roll, post-roll and banner commercial spots. The advertiser also informs the service provider about a budget he has for showing his commercials that needs to be exhausted before a deadline. An example of this information received from plurality of advertisers is illustrated in the table below.

| | CPM Commercials | | | | CPC Commercials | |
|---|---|---|---|---|---|---|
| Budget | Pre-roll | Post-roll | Mid-roll | Banner | Pre-roll | Post-roll ... |
| 1000 | 3 | 1 | 2 | 4 | 10 | 4 |
| 10000 | 2 | 1 | 4 | 3 | 20 | 7 |
| ... | ... | ... | ... | ... | ... | ... |

According to one embodiment, the service provider can either sell each commercial spot for each group of available commercials in an open auction, or publish advertisements to offer commercial spots for sale. The service provider can also invite for tenders to sell the commercial spots to advertisers.

Further, a first set of commercials is selected from the total available commercials to populate the number of commercial spots. To select the first set of commercials, eligible commercials are identified from the total available commercials based on the user's profile, and relevance to the multimedia content. A rank for each of the eligible commercials is calculated based on a degree of relevance of the eligible commercial with the user and the multimedia content. Further, the rank is also influenced by the cost that that the eligible commercial can recover in case it is included in the first set of commercials to be shown to the user. The cost is calculated based on the first set of commercials and the amount advertisers of each of the first set of commercials are willing to pay.

According to one embodiment of the present invention, the first set of commercials includes commercials from the cost per thousand impressions group of commercials. In a user scenario, if the user 108 inputs the first price (FP) as $4 for multimedia content offered at base price (BP) of $5, the cost that needs to be recovered is $1. The method described in this patent application calculates number of commercials that need to be shown to the user 108 to offer the content at $4, by using the amount that the customer is willing to pay for cost per thousand impressions commercials in each of the group of available commercial spots. If 'x' is the amount the advertiser is willing to pay for CPM commercials for each commercial spot, the number of commercials (N) that need to be shown is calculated by calculating $$\frac{\$1}{x/1000}.$$

In case the service provider does not have 'N' CPM commercials, but has 'n' CPM commercials, the service provider calculates best price by calculating: best price=$5−x/1000*n.

According to another embodiment of the present invention, the first set of commercials can include only cost-per-click commercials. Cost that needs to be recovered is dependent on the probability that the user 108 will click on the CPC commercials and interact with them in desired fashion. Number of commercials (N) that need to be shown is calculated using the probability of the action. For example if 'y' is the probability of the user clicking on the commercial, and 'c' is the amount that the advertiser is willing to pay, then the number of commercials to be shown to show the content at the first price (FP) is calculated as follows:

$$N = \frac{BP - FP}{y * c}$$

In case the service provider is unable to show N CPC commercials and has only 'n' CPC commercials, best price ($B_eP$) of the content is calculated as follows:

$$B_eP = BP - (y * c * n)$$

Similarly, the first set of commercials can include CPA commercials only. The number of CPA commercials that need to shown to the user is calculated using a probability that the user 108 will act in a desired manner after viewing the commercial, and the amount the advertiser is willing to pay for a CPA commercial for a commercial spot in the telecast of the content.

The method includes informing the user 108 that the multimedia content is available at the first price with the first set of commercials when the service provider has enough commercials. The best price is calculated taking into account the number of available commercials when service provider cannot offer the multimedia content at the first price.

Figure 5:
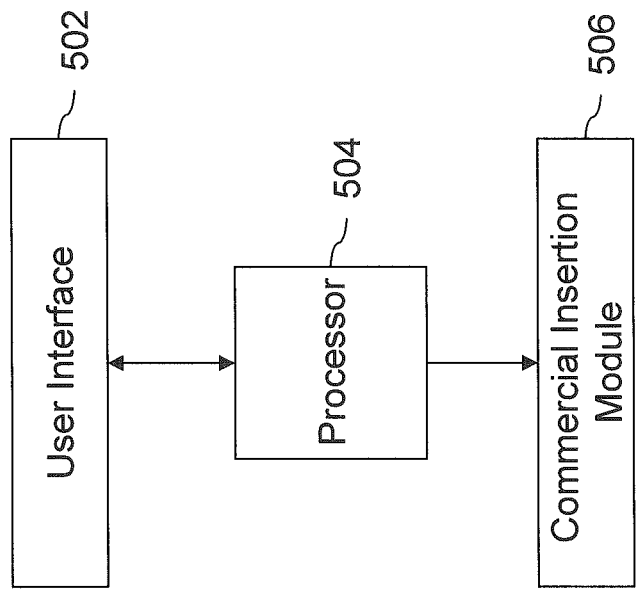
FIG. 5 illustrates a system for determining best price to rent the multimedia content being offered for viewing by the service provider to the user, in accordance with an embodiment of the present invention.

FIG. 5 illustrates a system for determining best price to rent the multimedia content being offered for viewing by the service provider to the user, in accordance with an embodiment of the present invention. The service provider offers the multimedia content at a base price. The system described in the following paragraphs allows the user 108 to negotiate price of the multimedia content with the service provider. The system includes a user interface 502 to receive a first price that the user 108 inputs through a plurality of input mechanisms. The first price is the price that the user is willing to pay for the multimedia content. Further, the system includes a processor 504 that is configured to calculate a number of commercials that need to be shown to the user 108 to offer the multimedia content to the user 108 at the first price. The calculation is based on a total number of available commercials with the service provider. The processor 504 is further configured to calculate a best price of the multimedia content that the service provider can offer to the user 108, when the service provider cannot offer the content at the first price. Furthermore, the system includes a commercials insertion module 506 that helps in adding commercials to the multimedia content based on the calculations.

According to one embodiment of the present invention, the plurality of input mechanisms include a remote control, a keyboard, a cellular phone, an e-mail, a text message, or a touch pad. The user 108 enters/communicates the first price with the help of one of the plurality of input mechanisms. The service provider receives this first price with the help of the user interface 504. The processor 504 interacts with the user interface 502 and receives the first price. The processor now calculates number of commercials that need to be shown to the user 108, with the help of available commercials in the commercials repository.

To calculate the number of commercials that need to be shown, the processor 504 calculates a total number of available commercials spots in the length of the multimedia content. The total number of available commercial spots is segregated in groups based on their time of occurrence in the multimedia content. The processor 504 further segregates the available commercial spots in groups based on their occurrence in the multimedia content. The groups of commercial spots, according to one embodiment, include pre-roll commercial spots, post-roll commercial spots, mid-roll commercial spots, and banner commercial spots.

According to another embodiment of the present invention, the system includes a commercials repository that stores all commercials that are available with the service provider. Commercials are received from an advertiser and stored in the commercials repository. The commercials repository also holds details about a commercial which includes a price the advertiser is willing to pay to have the commercial telecasted in a particular commercial spot group. Further, the commercials repository also stores descriptive and technical metadata for a commercial. Descriptive metadata may include title, and name of the product whereas technical metadata may include length, size, and format of the commercial. Further, the commercials repository also includes a budget of the advertiser for a particular commercial, and a deadline to exhaust the budget for that commercial. The commercials in the commercials repository are further segregated in groups based on their expected interaction with the user 108. The groups of available commercials include Cost-per-thousand-impressions commercials (CPM), cost-per-click (CPC) commercials, and cost-per-action (CPA) commercials.

According to yet another embodiment of the present invention, a first set of commercials is selected from the available commercials in the commercials repository, by the processor 504. The processor 504 chooses the first set of commercials based on the first price that the user 108 enters through the user interface 502. The first set of commercials are selected based on the calculation of the processor 504 to determine the number of commercials that need to be shown to the user 108 to offer the multimedia content at the first price. Calculations for the selection of commercials are explained in detail in conjunction with FIGS. 3 and 4. The first set of commercials is selected from the commercials repository based on a commercial's relevance to the multimedia content, and the user 108's profile. The processor 504 further determines the best price when the service provider does not have commercials equal to the number of commercials that need to be shown to the user 108 to offer the content at the first price. According to one embodiment, the processor 504 may also determine the best price when the service provider does not have commercials equal to the number of commercials calculated by the processor 504.

The commercials insertion module 506, based on the processor 504's output, inserts commercials from the first set of commercials in the multimedia content. The commercials may be inserted in one or more of the groups of commercial spots in the multimedia content. The commercials in the first of commercials are selected from the groups of available commercials in the commercials repository. The user 108 is shown the available options to rent the multimedia content, where the options include offering the content at the first price for the number of commercials calculated by the processor 504 or at the best price.

Figure 6:
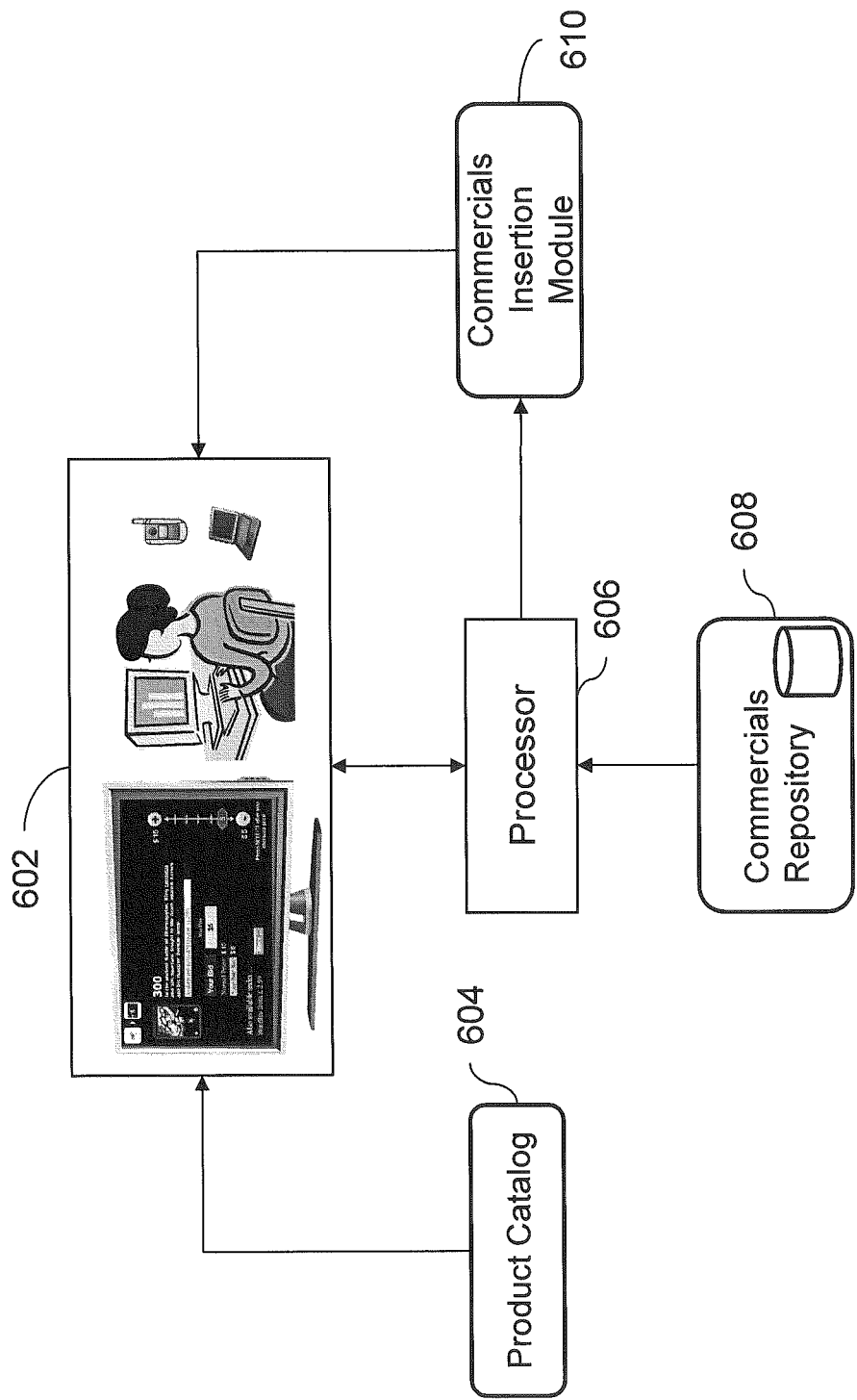
FIG. 6 is a detailed architecture of the system for determining best price to rent the multimedia content being offered for viewing by the service provider to the user, in accordance with an embodiment of the present invention.

FIG. 6 is a detailed architecture of the system for determining best price to rent the multimedia content being offered for viewing by the service provider to the user, in accordance with an embodiment of the present invention. FIG. 6 elaborates on the main elements of the system that were discussed in conjunction with FIG. 5. As shown in FIG. 6, the user 108 views a list of multimedia content offered for rent by the service provider on a screen of his viewing device. The service provider maintains a list of the content in a product catalog 604. The multimedia content is offered to the user 108 for a base price. The product catalog 604 may include other details related to the multimedia content such as cast, directors, and related multimedia content. The system further includes a user 108 entering a first price for the multimedia content through a plurality of input mechanisms 602. The plurality of input mechanisms includes a remote control, a keyboard, a cellular phone, an e-mail, a text message, or a touch pad.

The first price inputted by the user 108 using at least one of the plurality of input mechanisms 604 is received by the processor 606. The processor 606, as described in conjunction with FIG. 5, calculates a number of commercials that need to be shown to the user 108 to offer the multimedia content at the first price. The processor 606 calculates the number of commercials based on a number of commercial spots available in the length of the multimedia content. Further, the processor 606 segregates the commercial spots in groups based on their occurrence in the multimedia content. Furthermore, the processor 606, in communication with a commercials repository 608, selects a first set of commercials that need to be shown to the user 108 to offer the multimedia content at the first price or a best price. The best price is calculated by the processor 606 when the service provider does not have enough commercials in the commercials repository 608 to offer the content at the first price. The processor 606 selects commercials from the commercials repository 608 based on their relevance to the multimedia content and the user 108's profile. Further, the commercials repository 608 also stores pricing information, which includes a price that and advertiser is willing to pay for a commercial to be played in a particular group of commercial spots, a budget for the commercial, and a deadline before which the budget of the commercial needs to be exhausted. The system described in conjunction with FIG. 6 uses methods described along with FIGS. 3 and 4 to choose commercials in the first set of commercials, and determine the best price for the multimedia content.

Further, the system also includes a commercials insertion module 610 that inserts commercials in the multimedia content, based on its communication with the processor 606. Known techniques in the art are used to insert commercials in the multimedia content.

Figure 7:
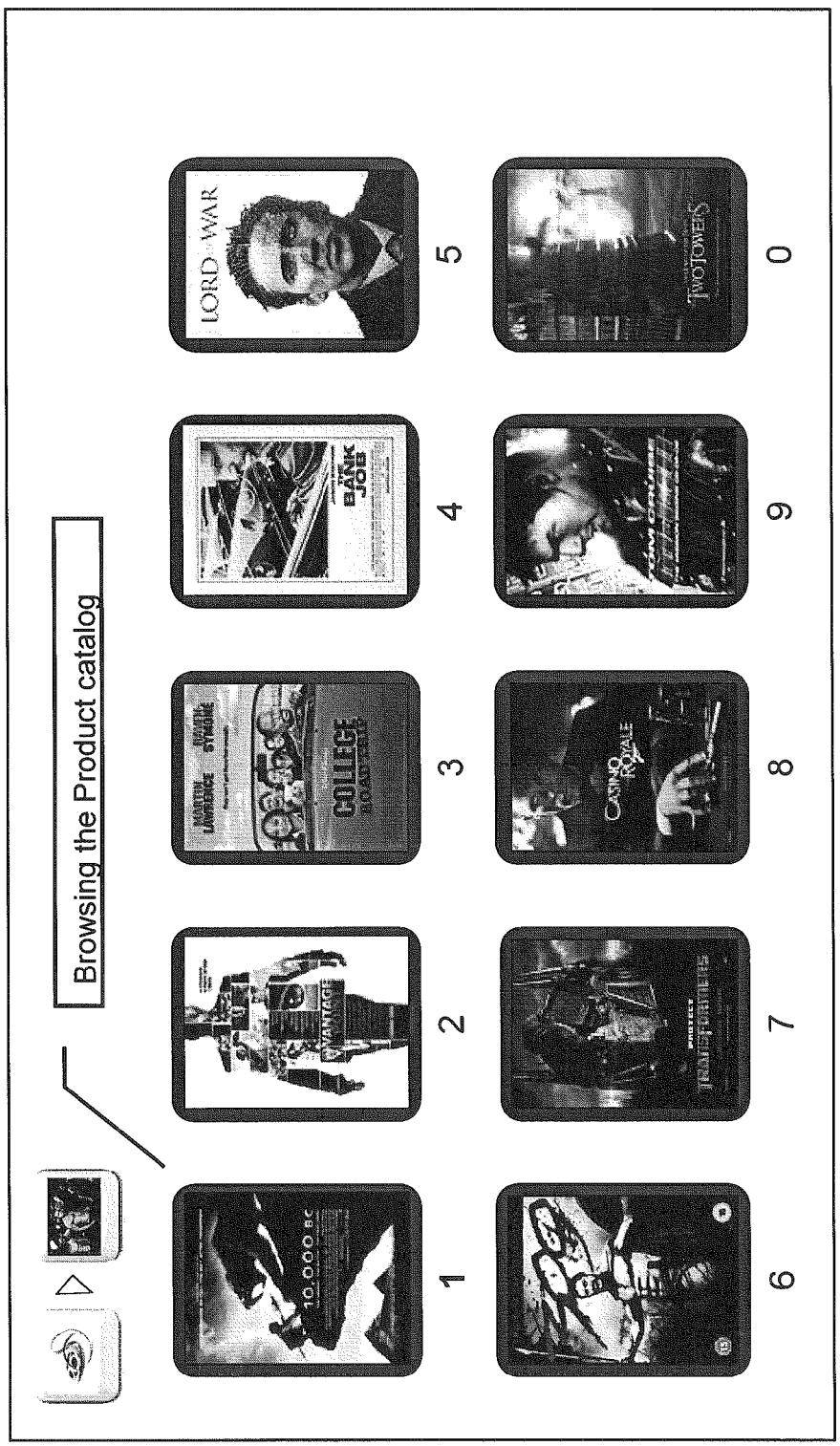
FIGS. 7-12 are exemplary screenshots of a scenario in which the user orders the multimedia content from the service provider, in accordance with an embodiment of the present invention.
Figure 8:

FIGS. 7-12 are exemplary screenshots of a scenario in which the user orders the multimedia content from the service provider, in accordance with an embodiment of the present invention. The scenario is described in detail taking the help of elements of FIGS. 5 and 6. FIG. 7 shows a screenshot of a product catalog 604 that is displayed to the user 108. The product catalog 604 shows a list of multimedia content that is offered for rent by the service provider. For example, as shown in FIG. 7, the user 108 can see that the service provider has offered movies such as '10000 B.C', '300', 'Casino Royale', and 'The Bank Job'. The user 108 can then, using a plurality of input mechanisms, select one of the multimedia content from the list to see more information related to the content. As shown in FIG. 8, the user 108 selects '300' the movie. The processor 504/606 reads information such as a plot synopsis, cast, and director from the product catalog 606 and shows it to the user 108.

Figure 9:
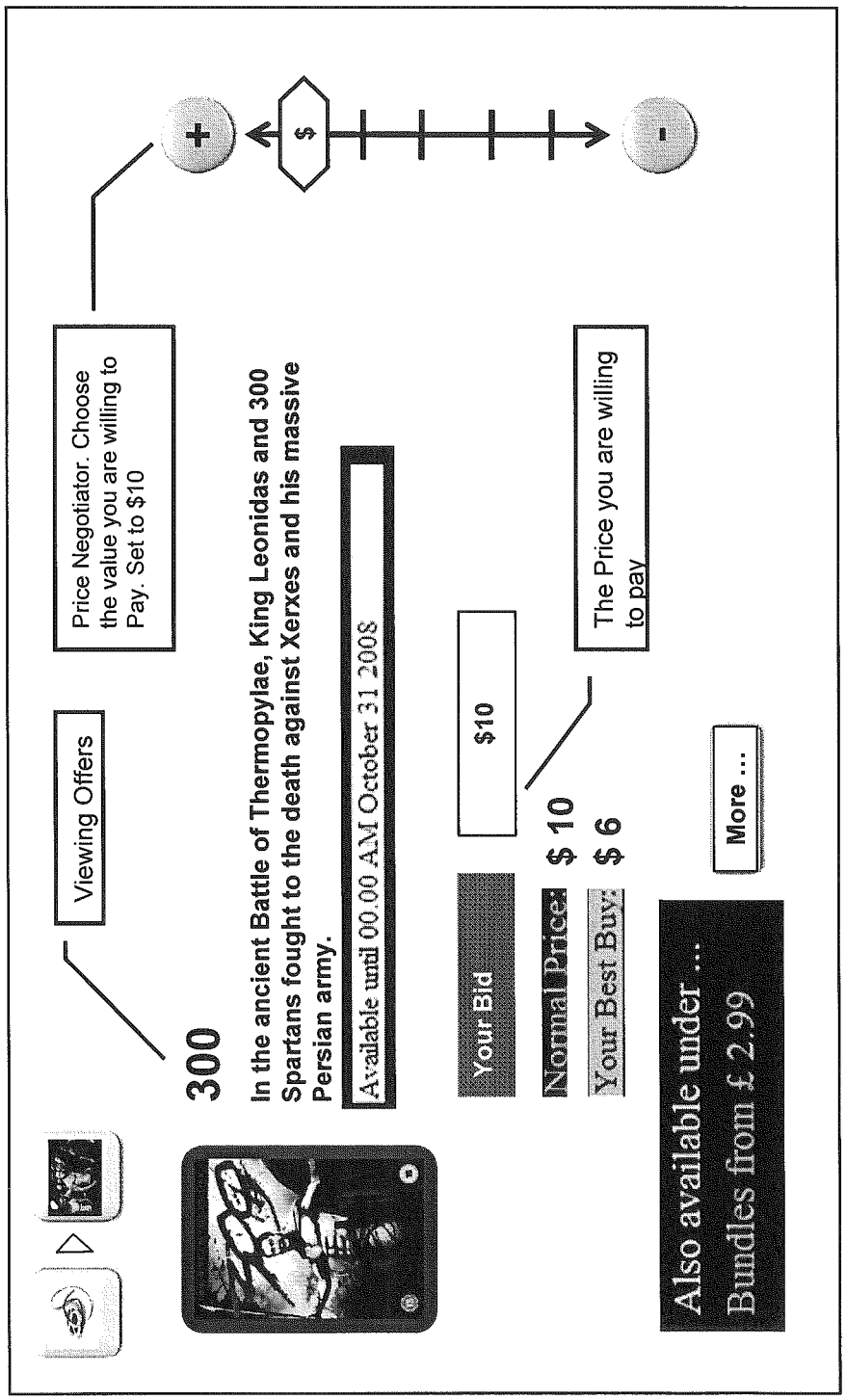
Figure 10:
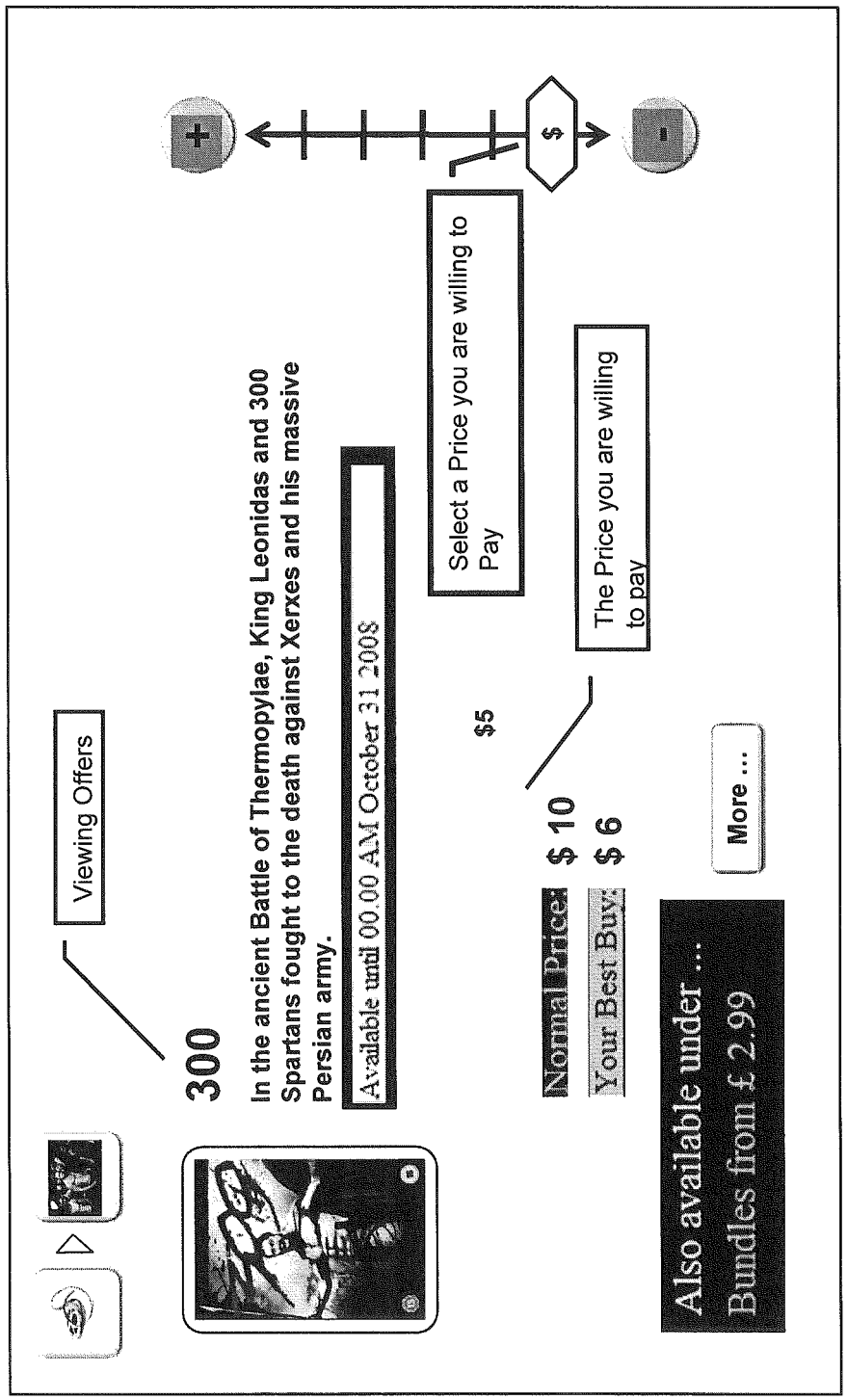
Figure 11:
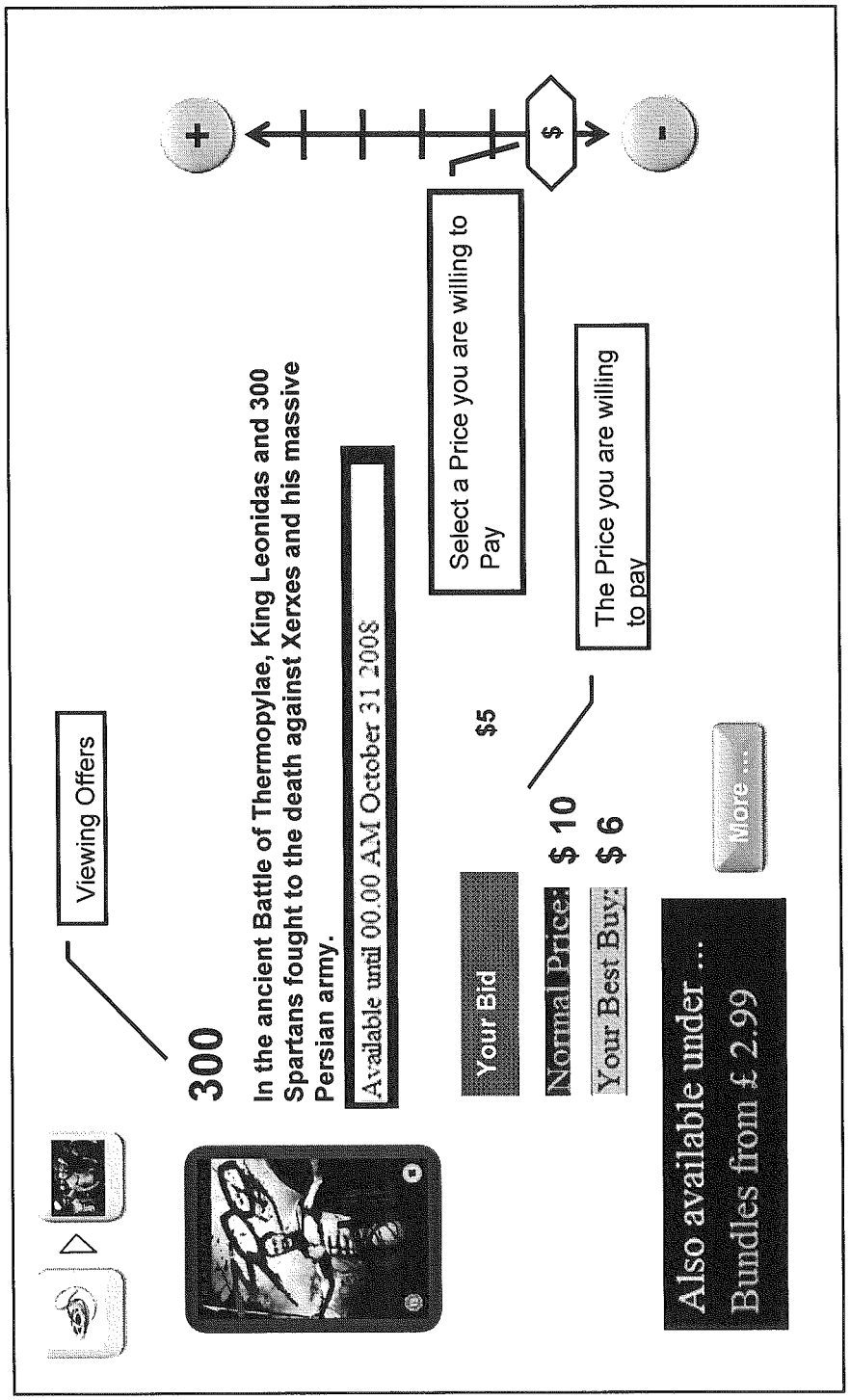
Figure 12:
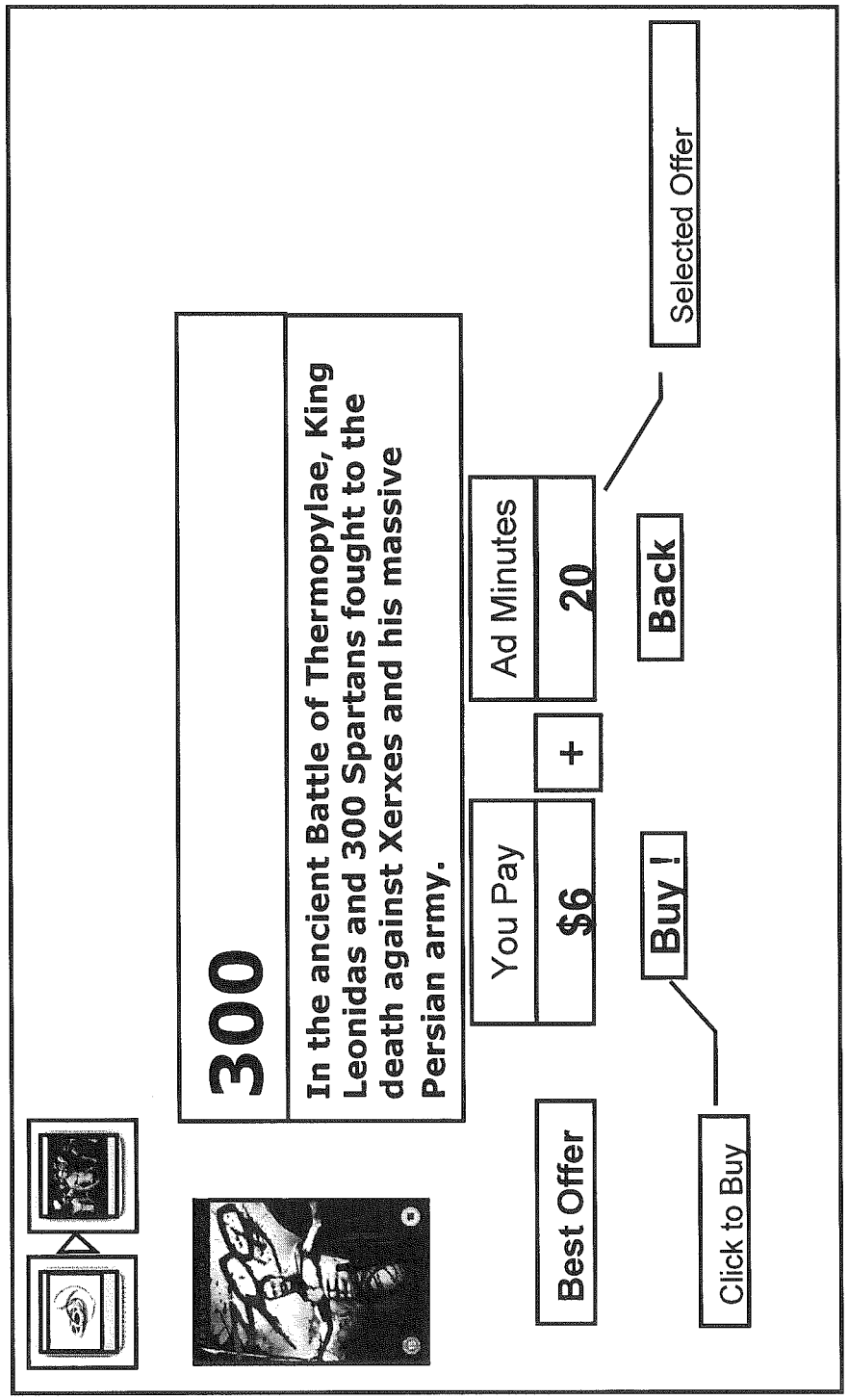

Further, as in FIG. 9, the user 108 is shown pricing information to rent '300'. The user 108 gets to see a best price, $10 in this example, a price negotiation field to enter a first price that the user wishes to pay to view the movie. The user 108 enters the first price using the plurality of input mechanisms 602. The user 108 can also use price negotiation bar on the right hand side of the screen to enter the first price. According to FIG. 10, the first price entered by the user 108 is $5. The processor 504/606 then calculates a number of commercials that need to be shown to the user 108 to show the movie at $5. The processor 504/606 uses information stored in the commercials repository 608 to calculate the number of commercials. As shown in FIG. 11, the processor 504/606 determines the number of commercials that need to be shown to the user 108 to offer the content at the first price. The processor also determines a best price for the content when the service provider does not have enough commercials in the commercials repository 608. The best price is also displayed on the user interface shown in FIG. 11. FIG. 12 illustrates the user interface to show the user 108 the best price, time of commercials in the multimedia content and a button to rent the content.

As will be appreciated by those ordinary skilled in the art, the foregoing example, demonstrations and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

While the following description is presented to enable a person of ordinary skill in the art to make and use the invention and is provided in the context of the requirement for a obtaining a patent the present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

The invention claimed is:

1. A method for determining a best price to rent a multimedia content being offered for viewing by at least one service provider to a plurality of users through a communication network, the method comprising:
  displaying, at a user interface of a communication device, the multimedia content being offered to the plurality of users, at a base price;
  receiving from a user a first price, at the user interface, that the user is willing to pay for the multimedia content, wherein the first price is less than the base price;
  responsive to receiving the first price at the user interface of the communication device, performing, via a processor, the steps of:

selecting a first set of commercials, including actionable and non-actionable commercials, from a total number of available commercials with the service provider based on user's profile, relevance to the multimedia content, budget of commercials, and deadline of each of the available commercials;

calculating a first number of commercials that need to be shown to the user to recover a cost of offering the multimedia content to the user at the first price, wherein the calculation is based on a type of interaction of available commercials with the user and a probability of the user interacting with the available commercials;

determining if total number of commercials in the first set of commercials is less than the first number of commercials required to recover the cost of offering the multimedia content to the user at the first price; and estimating, in response to the determination, an actual cost recovery value corresponding to the first set of commercials, wherein the estimation of the cost recovery value is based on cost of each of the first set of commercials, the total number of the first set of commercials and a total number of commercial spots available in the multimedia content; and determining a best price for offering the multimedia content to the user when the total number of commercials in the first set of commercials is less than the first number of commercials, wherein the determination of the best price comprises subtracting the estimated actual cost recovery value from the base price; and displaying, at the user interface of the communication device, the determined best price for offering the multimedia content to the user.

2. The method as recited in claim 1, wherein calculating the cost that needs to be recovered further comprises segregating each commercial from all available commercials in groups based on the type of interaction of the available commercials with the user.

3. The method as recited in claim 2, wherein the groups of the available commercials comprise cost per thousand impressions commercials, cost per click commercials, and cost per action commercials.

4. The method as recited in claim 3, further comprising calculating a total number of available commercial spots in the telecast of the multimedia content.

5. The method as recited in claim 4, further comprising segregating available commercial spots in groups based on their occurrence during telecast of the multimedia content, wherein the groups of available commercial spots comprise pre-roll, mid-roll, post-roll, and banner commercial spots.

6. The method as recited in claim 5, further comprising receiving an amount an advertiser wishes to pay for commercials that will be shown in each of the groups of available commercial spots.

7. The method as recited in claim 6, further comprising receiving a budget and a deadline for the commercials from the advertiser.

8. The method as recited in claim 7, wherein selecting the first set of commercials comprises populating the total number of available commercial spots.

9. The method as recited in claim 8, wherein selecting the first set of commercials from the total available commercials further comprises:

calculating a rank for each of the available commercials based on relevance of the commercial to the user and the multimedia content, and cost that can be recovered by showing each of the available commercials in the multimedia content.

10. The method as recited in claim 9, further comprising selecting each of the first set of commercials from the cost per thousand impressions commercials group of the set of commercials.

11. The method as recited in claim 9, further comprising selecting each of the first set of commercials from the cost per action commercials group of the set of commercials.

12. The method as recited in claim 9, further comprising selecting each of the first set of commercials from the cost per click commercials group of the set of commercials.

13. The method as recited in claim 9, further comprising selecting each of the first set of commercials from a plurality of the groups of available commercials.

14. A system for determining a best price to rent a multimedia content being offered for viewing by at least one service provider to a plurality of users through a communication network, the system comprising:

a user interface configured to:
    display the multimedia content being offered to the plurality of users, at a base price; and
    receive a first price from a user of the plurality of users with a plurality of input mechanisms, wherein first price is a price that the user is willing to pay to view the multimedia content;

a processor in communication with the user interface, responsive to receiving the first price, configured to perform the steps of:
    select a first set of commercials, including actionable and non-actionable commercials, from a total number of available commercials with the service provider based on user's profile, relevance to the multimedia content, budget of commercials, and deadline of each of the available commercials;
    calculate a first number of commercials that need to be shown to the user to recover a cost of offering the multimedia content to the user at the first price, wherein the calculation is based on a probability of the user interacting with the available commercials during the telecast of the multimedia content;
    determine if total number of commercials in the first set of commercials is less than the first number of commercials required to recover the cost of offering the multimedia content to the user at the first price;
    estimate, in response to the determination, an actual cost recovery value corresponding to the first set of commercials, wherein the estimation of the cost recovery value is based on cost of each of the first set of commercials, the total number of the first set of commercials and a total number of commercial spots available in the multimedia content; and
    determine a best price for offering the multimedia content to the user when the total number of commercials in the first set of commercials is less than the first number of commercials, wherein the determination of the best price comprises subtracting the estimated actual cost recovery value from the base price; and a commercial insertion module to insert commercials that need to be shown to the user during telecast of the multimedia content.

15. The system as recited in claim 14 wherein the plurality of input mechanisms comprise at least one of a group comprising a remote control, a keyboard, a cellular phone, an e-mail, a text message, and a touch pad.

16. The system as recited in claim 14, further comprising a commercials repository to store commercials that are available with the service provider.

17. The system as recited in claim 16, wherein the processor is further configured to calculate a total number of available commercial spots in the multimedia content.

18. The system as recited in claim 17, wherein the processor is further configured to segregate the total number of available commercial spots in groups.

19. The system as recited in claim 18, wherein the processor segregates the total number of available commercial spots based on the occurrence of a commercial spot in the telecast of the multimedia content, and wherein the groups of available commercial spots comprise pre-roll, mid-roll, post-roll, and banner commercial spots.

20. The system as recited in claim 14, wherein the processor is further configured to select the first set of commercials from the commercials repository to be shown in the total number of available commercial spots.

21. The system as recited in claim 20, wherein the processor is further configured to arrange each of the first set of commercials in a rank, and wherein the rank is based on the cost that can be recovered by each of the first set of commercials.

22. The system as recited in claim 16, wherein the processor segregates available commercials in the commercials repository in groups based on a type of their interaction with the user.

23. The system as recited in claim 22, wherein the groups of available commercials comprise cost per click commercials, cost per thousand impressions commercials, cost per action commercials and combinations thereof.

24. The system as recited in claim 23, wherein the processor is configured to receive an amount an advertiser wishes to pay for commercials that will be shown in each of the groups of available commercial spots.

25. The system as recited in claim 24, wherein the processor is further configured to receive a budget and a deadline for the commercials from the advertiser.

26. The system as recited in claim 14, wherein the processor is further configured to select the first set of commercials to populate the total number of available commercial spots.

27. The system as recited in claim 26, wherein the processor is configured to select the first set of commercials from the total available commercials by:
 calculating a rank for each of the available commercials based on relevance of the commercial to the user and the multimedia content, and cost that can be recovered by showing each of the available commercials in the multimedia content.

28. A non-transitory computer readable medium for determining a best price to rent a multimedia content being offered for viewing by at least one service provider to a plurality of users through a communication network, the computer program product comprising:
 a computer program code for displaying the multimedia content being offered to the plurality of users, at a base price;
 a computer program code for receiving a first price from a user from the plurality of users with a plurality of input mechanisms, wherein the first price is a price that the user is willing to pay to view the multimedia content;
 a computer program code for selecting a first set of commercials, including actionable and non-actionable commercials, from a total number of available commercials with the service provider based on user's profile, relevance to the multimedia content, budget of commercials, and deadline of each of the available commercials;
 a computer program code for calculating a first number of commercials that need to be shown to the user to recover a cost of offering the multimedia content to the user at the first price, wherein the calculation is based on a probability of the user interacting with the available commercials during the telecast of the multimedia content;
 a computer program code for determining if total number of commercials in the first set of commercials is less than the first number of commercials required to recover the cost of offering the multimedia content to the user at the first price;
 a computer program code for estimating, in response to the determination, an actual cost recovery value corresponding to the first set of commercials, wherein the estimation of the cost recovery value is based on cost of each of the first set of commercials, the total number of the first set of commercials and a total number of commercial spots available in the multimedia content; and
 a computer program code for determining a best price for offering the multimedia content to the user when the total number of commercials in the first set of commercials is less than the first number of commercials, wherein the determination of the best price comprises subtracting the estimated actual cost recovery value from the base price.

29. The non-transitory computer readable medium as recited in claim 28 wherein the plurality of input mechanisms comprise at least one of a group comprising a remote control, a keyboard, a cellular phone, an e-mail, a text message, and a touch pad.

30. The non-transitory computer readable medium as recited in claim 28 further comprising computer program code for storing commercials in a commercials repository.

31. The non-transitory computer readable medium as recited in claim 28, further comprising computer program code for:
 calculating a total number of available commercial spots in the multimedia content;
 segregating the total number of available commercial spots in groups, based on the occurrence of a commercial spot in the telecast of the multimedia content;
 selecting the first set of commercials from the commercials repository to be shown in the total number of available commercial spots;
 calculating the cost that can be recovered by showing the first set of commercials to the user during the telecast of the multimedia content based on a probability of the user interacting with the available commercials;
 arranging each of the first set of commercials in a rank, and wherein the rank is based on the cost that can be recovered by each of the first set of commercials; and
 segregating available commercials in the commercials repository in groups based on a type of their interaction with the user.

32. The non-transitory computer readable medium as recited in claim 31, further comprising computer program code for receiving a budget and a deadline for the commercials from the advertiser.

33. The non-transitory computer readable medium as recited in claim 32, further comprising computer program code for selecting the first set of commercials from the total available commercials by:
 calculating a rank for each of the available commercials based on relevance of the commercial to the user and the multimedia content, and cost that can be recovered by showing each of the available commercials in the multimedia content.

34. The method as recited in claim 6, wherein calculating the first number of commercials is based on a ratio of first value and a second value, the first value being calculated based on subtraction of the first price from the base price, the second value being calculated based on a product of the probability of the user interacting with the available commercials and the amount the advertiser wishes to pay for the available commercials.

35. The method as recited in claim 1, wherein the user inputs the first price via a negotiation mechanism at the user interface, wherein the negotiation mechanism comprises a price negotiation bar that provides one or more values for inputting the first price via a price negotiation field provided at the user interface.

* * * * *